(12) United States Patent
Okubo et al.

(10) Patent No.: US 12,095,131 B2
(45) Date of Patent: Sep. 17, 2024

(54) FUEL CELL AND FUEL CELL STACK

(71) Applicant: HONDA MOTOR CO., LTD., Tokyo (JP)

(72) Inventors: Takuro Okubo, Wako (JP); Shuhei Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 485 days.

(21) Appl. No.: 17/512,242

(22) Filed: Oct. 27, 2021

(65) Prior Publication Data

US 2022/0131173 A1 Apr. 28, 2022

(30) Foreign Application Priority Data

Oct. 28, 2020 (JP) .................. 2020-180413

(51) Int. Cl.
*H01M 8/2457* (2016.01)
*H01M 8/0258* (2016.01)
*H01M 8/0267* (2016.01)
*H01M 8/1004* (2016.01)

(52) U.S. Cl.
CPC ....... *H01M 8/2457* (2016.02); *H01M 8/0258* (2013.01); *H01M 8/0267* (2013.01); *H01M 8/1004* (2013.01)

(58) Field of Classification Search
None
See application file for complete search history.

(56) References Cited

U.S. PATENT DOCUMENTS

| | | |
|---|---|---|
| 2003/0049515 A1 | 3/2003 | Wariishi et al. |
| 2005/0026009 A1 | 2/2005 | Kusakabe et al. |
| 2011/0183227 A1 | 7/2011 | Tanaka et al. |
| 2012/0178004 A1 | 7/2012 | Ishida et al. |
| 2018/0342741 A1 | 11/2018 | Sakano et al. |
| 2019/0214656 A1 | 6/2019 | Ishida et al. |
| 2019/0393514 A1 | 12/2019 | Goto et al. |
| 2020/0274174 A1 | 8/2020 | Ohmori et al. |

FOREIGN PATENT DOCUMENTS

| | | |
|---|---|---|
| CN | 102136592 A | 7/2011 |
| CN | 102593485 A | 7/2012 |
| CN | 108933272 A | 12/2018 |

(Continued)

OTHER PUBLICATIONS

Office Action dated Oct. 31, 2023 issued in the corresponding Japanese Patent Application No. 2020-180413 with English machine translation thereof.

(Continued)

*Primary Examiner* — Carlos Barcena

(74) *Attorney, Agent, or Firm* — Carrier, Shende & Associates P.C.; Joseph P. Carrier; Fulchand P. Shende

(57) ABSTRACT

Each of a fuel cell and a fuel cell stack includes an anode discharge passage connected to one end of a fuel gas flow field in the horizontal direction and configured to discharge a fuel gas in a stacking direction in which a membrane electrode assembly and separators are stacked, and a cathode discharge passage connected to another end of an oxygen-containing gas flow field in the horizontal direction and configured to discharge an oxygen-containing gas in the stacking direction. A bottom portion of a lowermost cathode discharge passage is provided below a bottom portion of a lowermost anode discharge passage.

4 Claims, 6 Drawing Sheets

(56) References Cited

FOREIGN PATENT DOCUMENTS

| | | |
|---|---|---|
| CN | 110649278 A | 1/2020 |
| IN | 102130353 A | 7/2011 |
| JP | 2003-086231 A | 3/2003 |
| JP | 2005-038845 A | 2/2005 |
| JP | 2011-142113 A | 7/2011 |
| JP | 2015-060732 A | 3/2015 |
| JP | 2015-076234 A | 4/2015 |
| JP | 2019-121562 A | 7/2019 |
| JP | 2020-136177 A | 8/2020 |

OTHER PUBLICATIONS

Office Action dated Oct. 11, 2023 issued in the corresponding Chinese Patent Application No. 202111246700.5 with the English machine translation thereof.
Office Action dated Jul. 4, 2023 issued in the corresponding Japanese Patent Application No. 2020-180413 with the English translation thereof.

FUEL CELL AND FUEL CELL STACK

CROSS-REFERENCE TO RELATED APPLICATION

This application is based upon and claims the benefit of priority from Japanese Patent Application No. 2020-180413 filed on Oct. 28, 2020, the contents of which are incorporated herein by reference.

BACKGROUND OF THE INVENTION

Field of the Invention

The present invention relates to a fuel cell having separators on both sides of a membrane electrode assembly, and a fuel cell stack.

Description of the Related Art

In general, a solid polymer electrolyte fuel cell has a solid polymer electrolyte membrane. The solid polymer electrolyte membrane is a polymer ion exchange membrane. A fuel cell includes a membrane electrode assembly (MEA). The membrane electrode assembly (MEA) has an anode on one surface of the solid polymer electrolyte membrane. The membrane electrode assembly (MEA) has a cathode on the other surface of the solid polymer electrolyte membrane.

A fuel cell (power generation cell) has a structure in which the membrane electrode assembly is sandwiched between separators (bipolar plates). In use, a predetermined number of fuel cells are stacked together to form, e.g., an in-vehicle fuel cell stack mounted in a vehicle.

The fuel cell stack of this type includes reactant gas supply passages (an anode supply passage and a cathode supply passage) and reactant gas discharge passages (an anode discharge passage and a cathode discharge passage). These supply passages and discharge passages extend through the fuel cells in the stacking direction. The reactant gas supply passages and the reactant gas discharge passages are connected to reactant gas flow fields (a fuel gas flow field and an oxygen-containing gas flow field) for supplying reactant gases along electrode surfaces.

As described in JP 2019-121562 A, during power generation of a fuel cell, water is produced as a result of a reaction between a fuel gas and an oxygen-containing gas. The produced water flows into the reactant gas discharge passages through the reactant gas flow fields. JP 2019-121562 A points out that when the produced water stagnates in the reactant gas discharge passages, the reactant gas does not flow smoothly and the power generation performance is degraded.

SUMMARY OF THE INVENTION

When the fuel cell stack is mounted in a vehicle or the like, the fuel cell stack may be inclined while it is generating power. However, in the conventional fuel cell stack, there is a concern that the produced water may stagnate in the reactant gas discharge passage depending on the inclination direction.

Therefore, an object of the present invention is to provide a fuel cell and a fuel cell stack in which it is possible to discharge produced water without stagnation even when the fuel cell is inclined.

A fuel cell according to one aspect of the present invention includes a membrane electrode assembly in which an anode and a cathode are arranged on both sides of an electrolyte membrane, respectively, separators disposed on both surfaces of the membrane electrode assembly, and a fuel gas flow field formed between the anode of the membrane electrode assembly and one of the separators, and configured to allow a fuel gas to flow in a horizontal direction, and an oxygen-containing gas flow field formed between the cathode of the membrane electrode assembly and another of the separators, and configured to allow an oxygen-containing gas to flow in the horizontal direction, wherein a stacking direction in which the membrane electrode assembly and the separators are stacked is orthogonal to the horizontal direction, an anode discharge passage is formed in a lower portion of one end of the fuel cell in the horizontal direction that is orthogonal to the stacking direction, and the anode discharge passage is connected to the fuel gas flow field and configured to discharge the fuel gas in the stacking direction in which the membrane electrode assembly and the separators are stacked, and a cathode discharge passage is formed in a lower portion of another end of the fuel cell in the horizontal direction orthogonal to the stacking direction, and the cathode discharge passage is connected to the oxygen-containing gas flow field and configured to discharge the oxygen-containing gas in the stacking direction, and a bottom portion of the cathode discharge passage is provided below a bottom portion of the anode discharge passage.

According to another aspect of the present invention, a fuel cell stack is equipped with a stack body that includes a plurality of stacked fuel cells with the above aspect.

In the fuel cell and the fuel cell stack according to the above aspects, it is possible to discharge produced water without stagnation even when the fuel cell is inclined.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

In the following description, an "upper side", of a fuel cell stack 10 is defined as a vertically-upper side in the arrangement when the fuel cell stack 10 is mounted in a vehicle or the like, and a "lower side", thereof is defined as a vertically-lower side in the arrangement.

Figure 1:
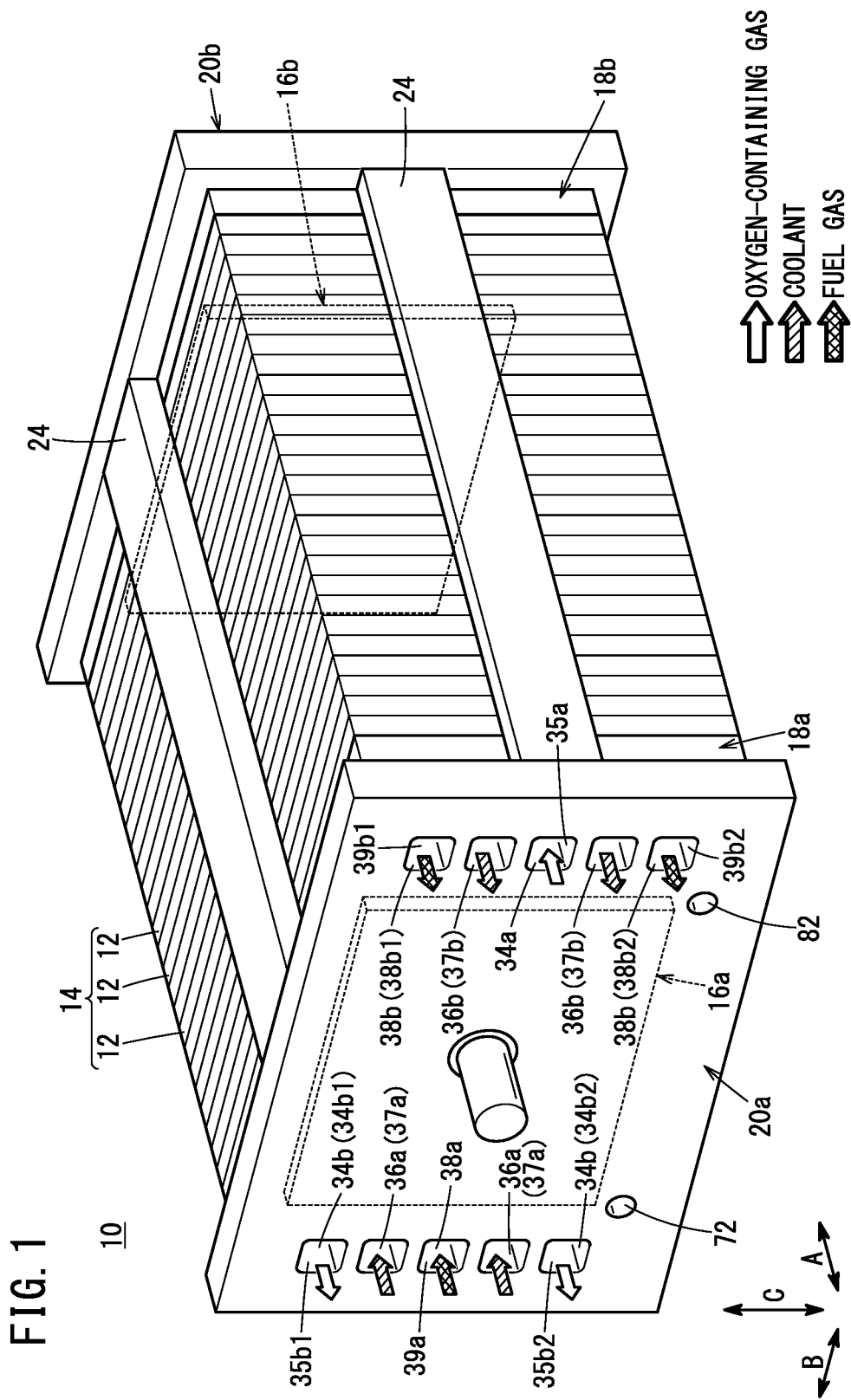
FIG. 1 is a perspective view showing a fuel cell stack according to an embodiment of the present invention.

As shown in FIG. 1, the fuel cell stack 10 according to the present embodiment includes a stack body 14 formed by stacking a plurality of fuel cells (power generation cells) 12 in a horizontal direction (indicated by an arrow A). For example, the fuel cell stack 10 is mounted in a fuel cell electric automobile (not shown) or a transportation device (not shown).

At one end of the stack body 14 in the stacking direction (indicated by the arrow A), a terminal plate 16a (power collection plate) is disposed. An insulator 18a is disposed outside the terminal plate 16a, and an end plate 20a is disposed outside the insulator 18a. At the other end of the stack body 14 in the stacking direction, a terminal plate 16b is disposed. An insulator 18b is disposed outside the terminal plate 16b, and an end plate 20b is disposed outside the insulator 18b. The insulator 18a (one of the insulators 18a, 18b) is disposed between the stack body 14 and the end plate 20a (one of the end plates 20a, 20b). The other insulator 18b is disposed between the stack body 14 and the other end plate 20b. Each of the insulators 18a, 18b is made of insulating material such as polycarbonate or phenol resin.

The end plates 20a, 20b have a laterally elongated (or longitudinally elongated) rectangular shape. Coupling bars 24 are disposed between the sides of the end plates 20a, 20b. Both ends of each of the coupling bars 24 are fixed to the inner surfaces of the end plates 20a, 20b. Each of the coupling bars 24 apply a tightening load to the stacked fuel cells 12 in the stacking direction (direction indicated by the arrow A). It should be noted that the fuel cell stack 10 may be provided with a casing including the end plates 20a, 20b. In this instance, the casing accommodates the stack body 14 therein.

Figure 2:
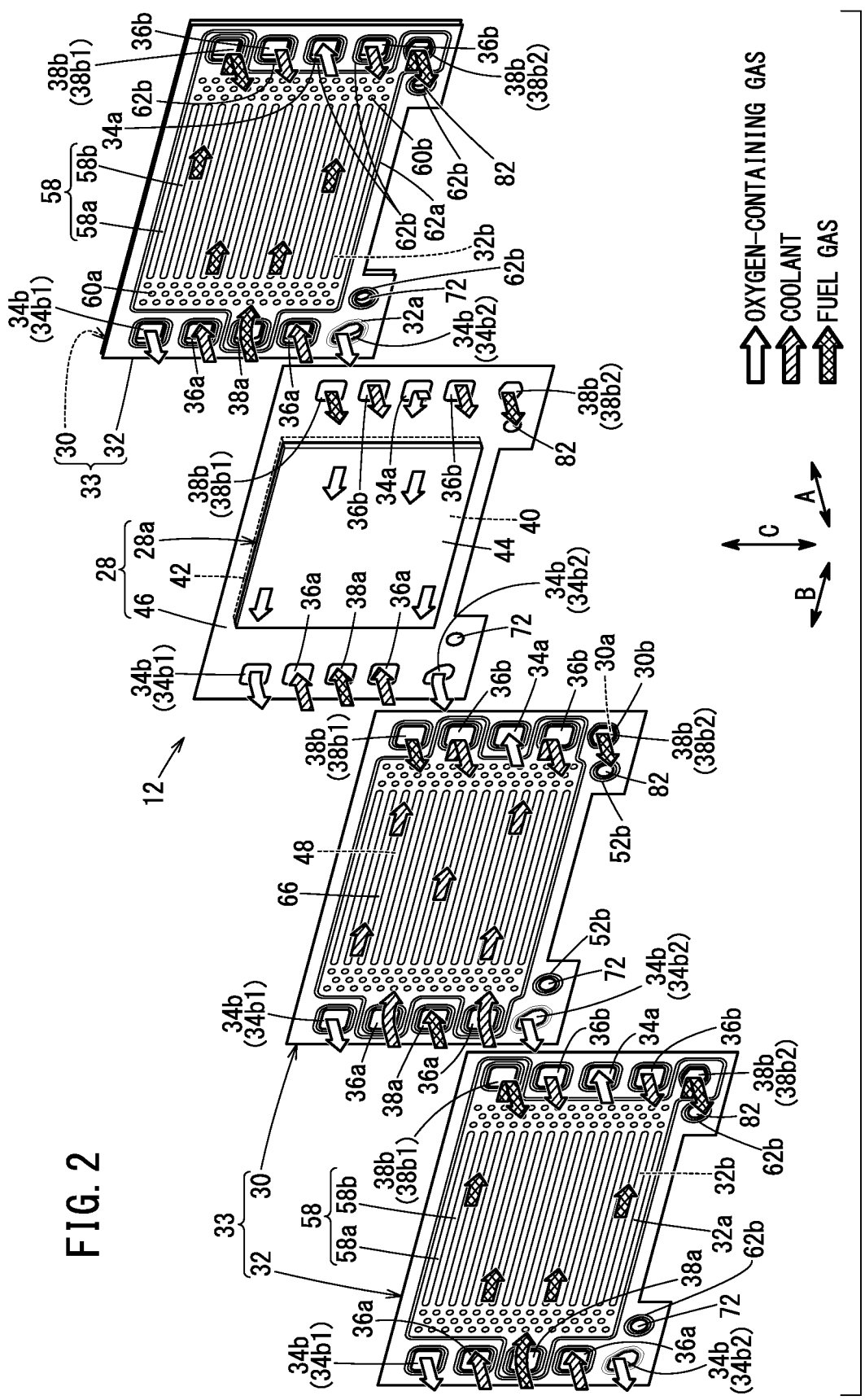
FIG. 2 is an exploded perspective view showing a fuel cell.

As shown in FIG. 2, the fuel cell 12 has a structure in which a resin frame equipped MEA 28 is sandwiched between a first metal separator 30 and a second metal separator 32. For example, each of the first metal separator 30 and the second metal separator 32 is a steel plate, a stainless steel plate, an aluminum plate, a plated steel plate, or a metal plate having an anti-corrosive surface by surface treatment, and formed by press forming to have a corrugated shape in cross section and a wavy shape on the surface. The first metal separator 30 and the second metal separator 32 constitute a joint separator 33. In the joint separator 33, the first metal separator 30 and the second metal separator 32 are joined together at their outer peripheral portions by welding, brazing, crimping, or the like.

The resin frame equipped MEA 28 includes a membrane electrode assembly 28a (hereinafter referred to as "MEA 28a") and a resin frame member 46 provided so as to surround the outer peripheral part of the MEA 28a. The resin frame member 46 is joined to the MEA 28a. The MEA 28a includes an electrolyte membrane 40, and an anode 42 provided on one surface (also referred to as an anode surface) of the electrolyte membrane 40, and a cathode 44 provided on the other surface (also referred to as a cathode surface) of the electrolyte membrane 40.

For example, the electrolyte membrane 40 is a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte membrane may be used as the electrolyte membrane 40. Alternatively, an HC (hydrocarbon) based electrolyte membrane may be used as the electrolyte membrane 40.

Though not shown in detail, the anode 42 includes an anode catalyst layer joined to one surface of the electrolyte membrane 40, and an anode diffusion layer stacked on the anode catalyst layer. The cathode 44 includes a cathode catalyst layer joined to the other surface of the electrolyte membrane 40 and a cathode diffusion layer stacked on the cathode catalyst layer.

At one end of the fuel cell 12 in a longitudinal direction indicated by an arrow B (horizontal direction in FIG. 2), one cathode supply passage 34a, a plurality of (for example, two) coolant discharge passages 36b, and a plurality of (for example, two) anode discharge passages 38b are provided. Each of these passages extends in the stacking direction. The cathode supply passage 34a, the plurality of coolant discharge passages 36b, and the plurality of anode discharge passages 38b penetrate through the stack body 14, the insulator 18a, and the end plate 20a (see FIG. 1) in the stacking direction. The cathode supply passage 34a, the plurality of coolant discharge passages 36b, and the plurality of anode discharge passages 38b may extend through the terminal plate 16a.

These passages are arranged in the vertical direction at substantially equal intervals. A fuel gas as one of the reactant gases is discharged through the anode discharge passages 38b. The fuel gas is not particularly limited, but is, for example, a hydrogen gas (hydrogen-containing gas) containing water (moisture). An oxygen-containing gas as the other of reactant gases is supplied through the cathode supply passage 34a. The oxygen-containing gas is not particularly limited, but is, for example, air containing water (moisture). A coolant is discharged through the coolant discharge passages 36b. The two coolant discharge passages 36b are arranged vertically at a distance.

The cathode supply passage 34a is disposed between the coolant discharge passages 36b. The plurality of anode discharge passages 38b include an upper anode discharge passage 38b1 and a lower anode discharge passage 38b2. The upper anode discharge passage 38b1 is disposed above the upper coolant discharge passage 36b. The lower anode discharge passage 38b2 is disposed below the lower coolant discharge passage 36b. That is, the lower anode discharge passage 38b2 is the anode discharge passage 38b at the lowermost end.

At the other end of the fuel cell 12 in the longitudinal direction indicated by the arrow B, one anode supply passage 38a, a plurality of (for example, two) coolant supply passages 36a, and a plurality of (for example, two) cathode discharge passages 34b are provided. Each of these passages extends in the stacking direction. The anode supply passage 38a, the plurality of coolant supply passages 36a, and the plurality of cathode discharge passages 34b penetrate through the stack body 14, the insulator 18a, and the end plate 20a in the stacking direction. The anode supply passage 38a, the plurality of coolant supply passages 36a, and the plurality of cathode discharge passages 34b may extend through the terminal plate 16a.

Figure 3:
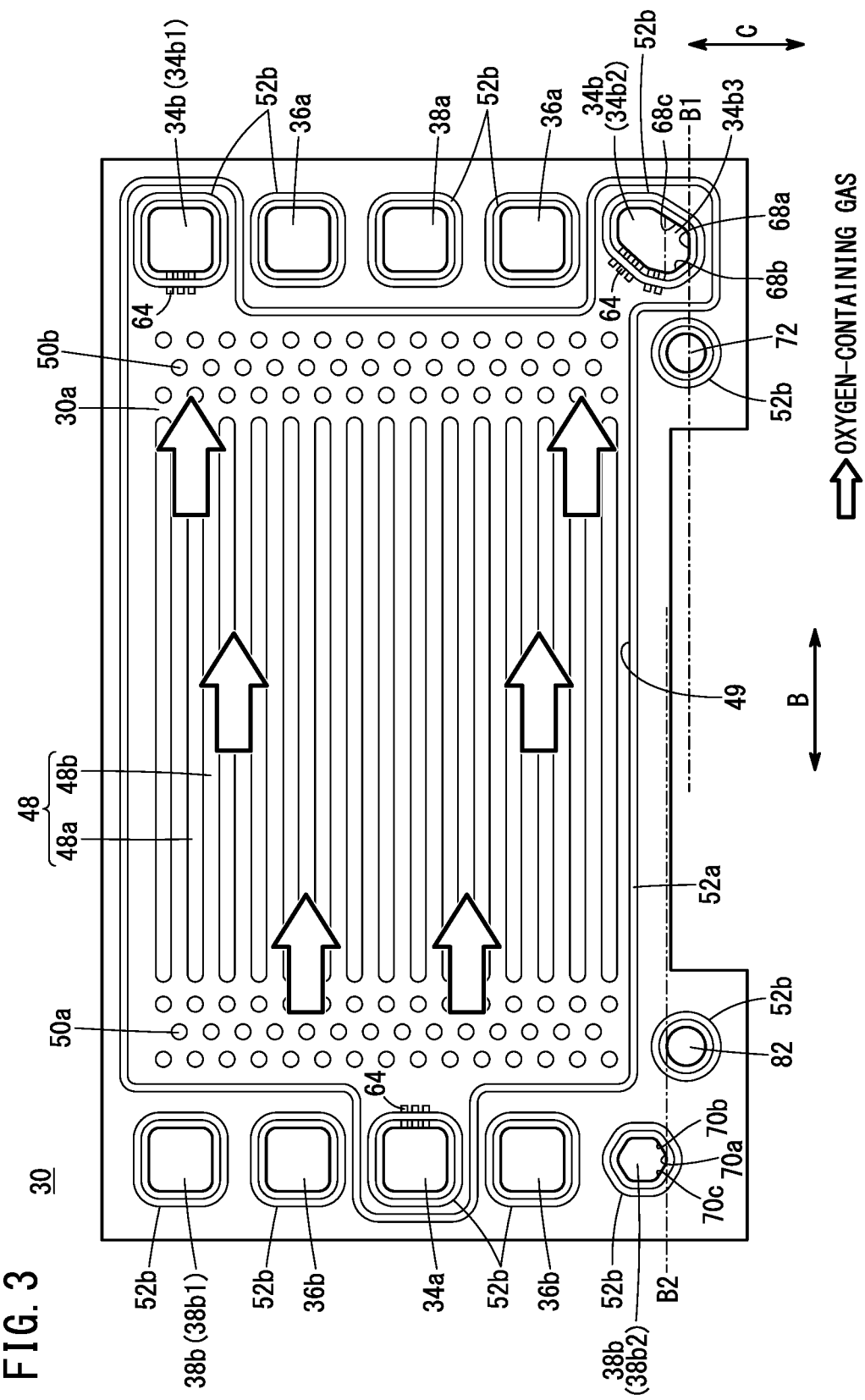
FIG. 3 is a view showing structure of a first metal separator as viewed from a side where an oxygen-containing gas flow field is present.
Figure 4:
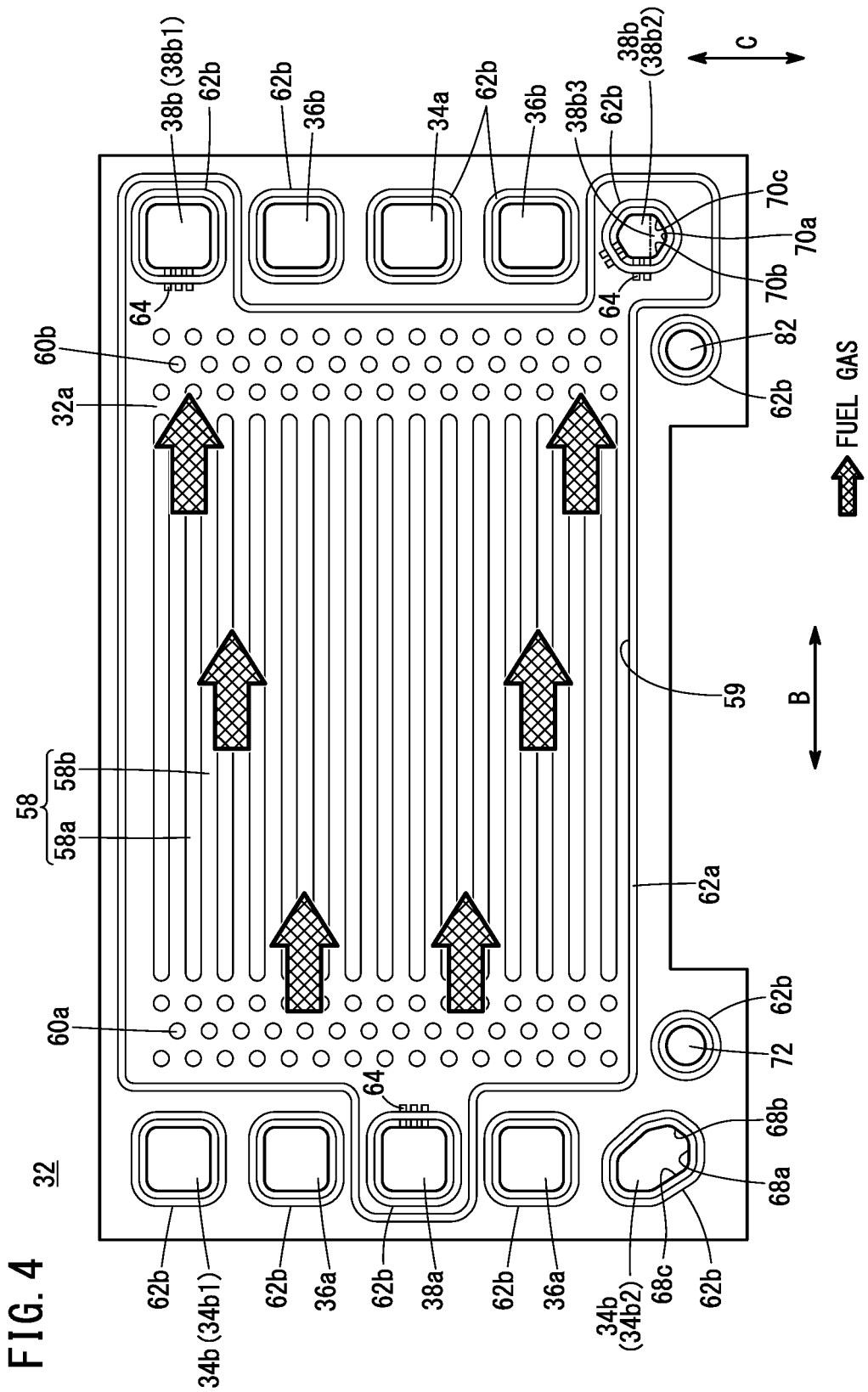
FIG. 4 is a view showing structure of a second metal separator as viewed from a side where a fuel gas flow field is present.

As shown in FIGS. 3 and 4, these passages are arranged in the vertical direction at substantially equal intervals. The fuel gas is supplied through the anode supply passage 38a. The coolant is supplied through the coolant supply passage 36a. The two coolant supply passages 36a are arranged vertically at a distance. The oxygen-containing gas is discharged through the cathode discharge passage 34b.

The anode supply passage 38a is disposed between the two coolant supply passages 36a. The plurality of cathode discharge passages 34b include an upper cathode discharge passage 34b1 and a lower cathode discharge passage 34b2.

The upper cathode discharge passage 34b1 is disposed above the upper coolant supply passage 36a. The lower cathode discharge passage 34b2 is disposed below the lower coolant supply passage 36a. In the present embodiment, the lower cathode discharge passage 34b2 is the cathode discharge passage 34b at the lowermost end.

The layout of the cathode supply passage 34a, the plurality of cathode discharge passages 34b, the anode supply passage 38a, and the plurality of anode discharge passages 38b is not limited to the layout in the present embodiment, but may be appropriately set according to required specifications. The cathode supply passage 34a, the upper cathode discharge passage 34b1, the coolant supply passage 36a, the coolant discharge passage 36b, the anode supply passage 38a, and the upper anode discharge passage 38b1 may have a quadrangular shape or other polygonal shapes in a plan view as viewed in the direction of the arrow A.

Figure 6:
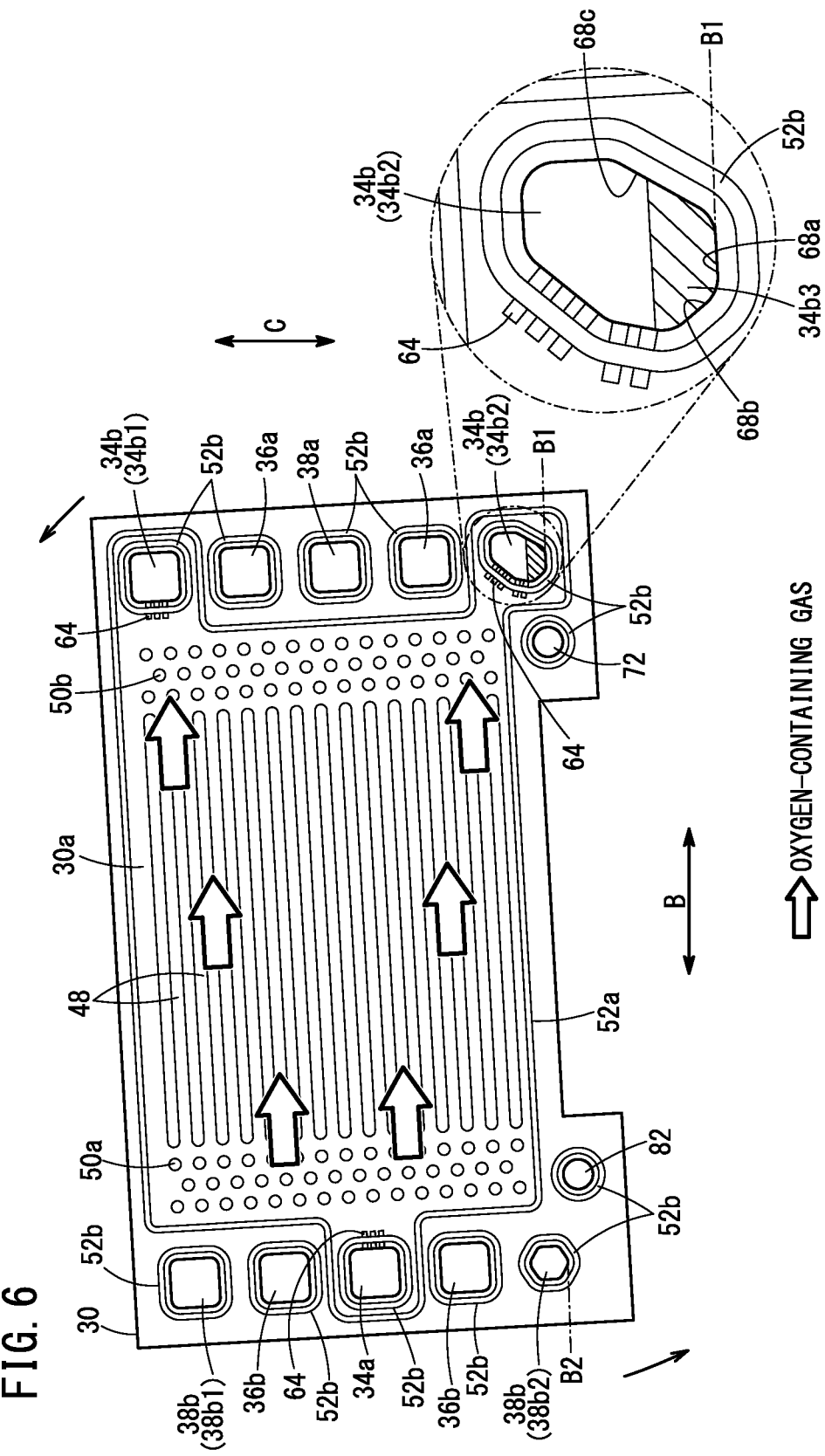
FIG. 6 is a view showing a state in which the fuel cell stack in inclined such that the other end of the fuel cell stack is higher than the one end.

As shown in FIG. 6, the shape of the lower cathode discharge passage 34b2 is a heptagon obtained by cutting off corners of a distorted quadrangle (parallelogram). The shape of the lower cathode discharge passage 34b2 is the same in the first metal separator 30 and the second metal separator 32. The lower cathode discharge passage 34b2 has a linear bottom portion 68a in parallel to the horizontal direction (indicated by the arrow B) at the lower end. Inclined portions 68b and 68c inclined so as to obliquely spread upward are formed on both side portions of the bottom portion 68a. The tunnel portions 64 are formed above the inclined portion 68b. The tunnel portions 64 allow the lower cathode discharge passage 34b2 and an oxygen-containing gas flow field 48 to connect with each other. Tunnel portions 64 are also provided in other passages 34a, 38a, 34b1, and 38b1. In the lower cathode discharge passage 34b2, a range from the bottom portion 68a to the lower end of the tunnel portion 64 is a water stagnant portion 34b3 in which the water discharged together with the oxygen-containing gas can be held temporarily. Within the range of the water stagnant portion 34b3, the stagnant water can be held without flowing back to the power generation surface through the tunnel portions 64. The stagnant water in the water stagnant portion 34b3 is eventually discharged through a drain hole 72. That is, the water stagnant portion 34b3 temporarily holds the stagnant water. The volume of the water stagnant portion 34b3 increases as the cross section of the lower cathode discharge passage 34b2 near the bottom portion 68a increases. In order to increase the volume of the water stagnant portion 34b3, the bottom portion 68a is configured as a straight side.

Figure 5:
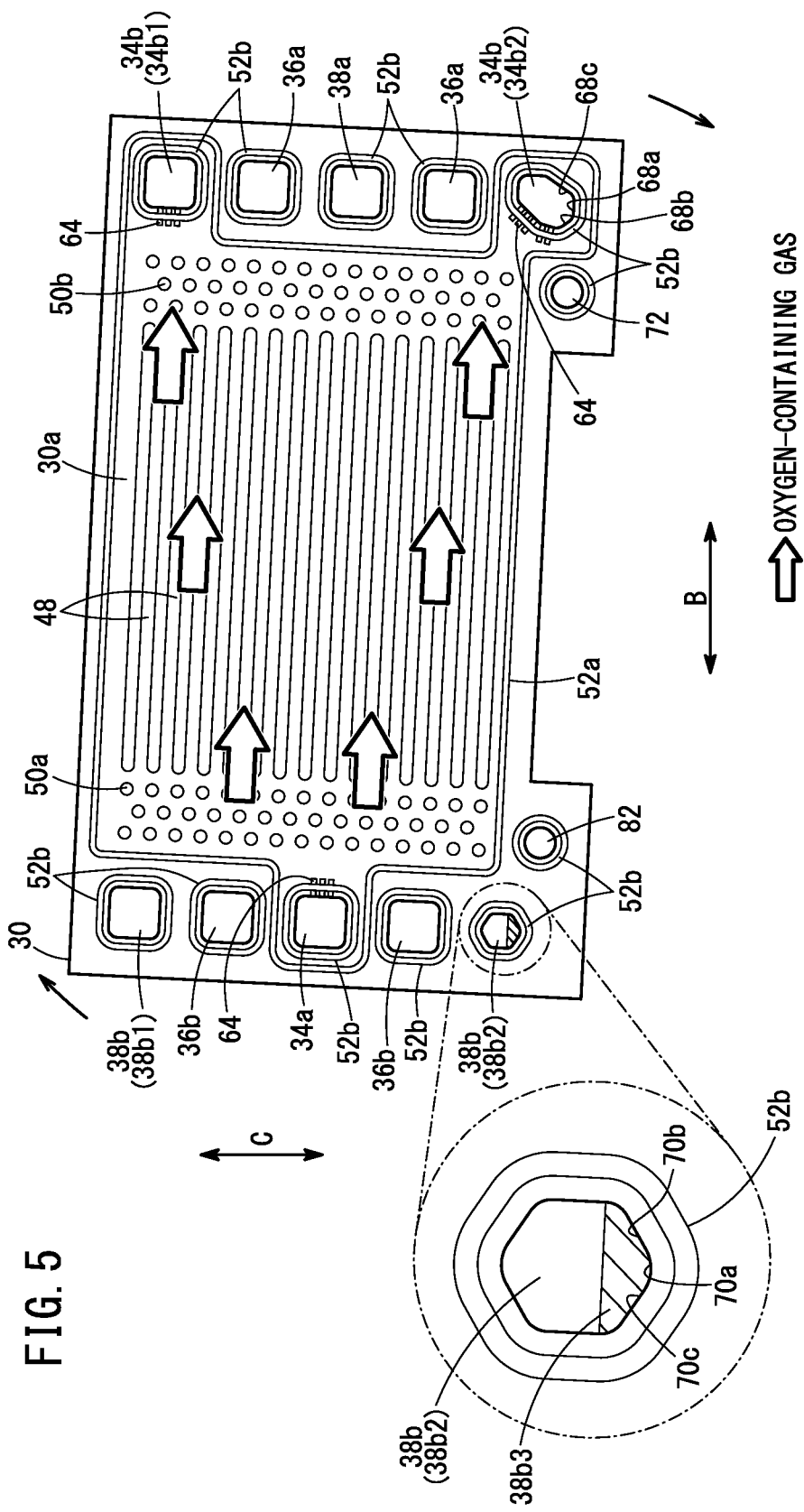
FIG. 5 is a view showing a state in which the fuel cell stack in inclined in a direction such that one end of the fuel cell stack is higher than another end thereof.

As shown in FIG. 5, the lower anode discharge passage 38b2 has a hexagonal shape. The lower anode discharge passage 38b2 has a bottom portion 70a having a bent portion at its lower end. The lower anode discharge passage 38b2 has inclined portions 70b and 70c inclined so as to obliquely spread upward on both side portions of the bottom portion 70a. In the second metal separator 32, the lower anode discharge passage 38b2 has tunnel portions 64. The tunnel portions 64 are disposed above the inclined portion 70b. The tunnel portions 64 allow the lower anode discharge passage 38b2 and a fuel gas flow field 58 to connect with each other. The tunnel portions 64 are also referred to as bridge portions. In the present embodiment, the lower anode discharge passage 38b2 has a water stagnant portion 38b3. The water stagnant portion 38b3 occupies a range from the bottom portion 70a to the lower end of the tunnel portions 64 (bridge portions). A drain hole 82 discharges the stagnant water in the water stagnant portion 38b3.

The lower cathode discharge passage 34b2 and the lower anode discharge passage 38b2 also serve as discharge paths for water produced by chemical reactions on the power generation surface of the fuel cell 12. In order to discharge water without causing water to flow back to the power generation surface, a portion of the lower side of the lower cathode discharge passage 34b2 is positioned even lower than the lowermost end portion of the power generation surface of the fuel cell 12. That is, the lower cathode discharge passage 34b2 is positioned even lower than the oxygen-containing gas flow field 48 or the fuel gas flow field 58. Also, a portion of the lower side of the lower anode discharge passage 38b2 is positioned even lower than the lowermost end of the power generation surface of the fuel cell 12.

Further, as shown in FIG. 3, in the present embodiment, a position B1 of the bottom portion 68a constituting the lower end portion of the lower cathode discharge passage 34b2 is positioned even lower than a position B2 of the bottom portion 70a constituting the lower end portion of the lower anode discharge passage 38b2. Therefore, the volume of the water stagnant portion 34b3 (FIG. 3) of the lower cathode discharge passage 34b2 is larger than the volume of the water stagnant portion 38b3 (FIG. 4) of the lower anode discharge passage 38b2.

As shown in FIG. 1, the cathode supply passage 34a, the coolant supply passage 36a, and the anode supply passage 38a are connected to inlets 35a, 37a, and 39a of the end plate 20a, respectively. The upper cathode discharge passage 34b1, the lower cathode discharge passage 34b2, the coolant discharge passage 36b, the upper anode discharge passage 38b1, and the lower anode discharge passage 38b2 are connected to outlets 35b1, 35b2, 37b, 39b1, and 39b2 of the end plate 20a, respectively.

As shown in FIG. 2, at one end of the resin frame member 46 in the direction indicated by the arrow B, one cathode supply passage 34a, a plurality of coolant discharge passages 36b, and a plurality of anode discharge passages 38b are provided. The resin frame member 46 has, for example, two coolant discharge passages 36b and two anode discharge passages 38b. At the other end of the resin frame member 46 in the direction indicated by the arrow B, one anode supply passage 38a, a plurality of coolant supply passages 36a, and a plurality of cathode discharge passages 34b are provided. The resin frame member 46 has, for example, two coolant supply passages 36a and two cathode discharge passages 34b.

The resin frame equipped MEA 28 need not necessarily have the resin frame member 46. The electrolyte membrane 40 may protrude outward from the resin frame equipped MEA 28 instead of the resin frame member 46. Further, the resin frame equipped MEA 28 may have frame shaped films on both sides in the thickness wise direction of the electrolyte membrane 40 which protrudes outward.

As shown in FIG. 3, the first metal separator 30 has the oxygen-containing gas flow field 48 on its surface 30a facing the resin frame equipped MEA 28. The oxygen-containing gas flows in the oxygen-containing gas flow field 48 facing the electrode surface in the horizontal direction indicated by the arrow B. One end of the oxygen-containing gas flow field 48 in the direction indicated by the arrow B is connected to (in fluid communication with) the cathode supply passage 34a. The other end of the oxygen-containing gas flow field 48 in the direction indicated by the arrow B is connected to (in fluid communication with) the cathode discharge passage 34b. The oxygen-containing gas flow field 48 includes a plurality of ridges 48a and a plurality of oxygen-containing gas flow grooves 48b. Each of the ridges 48a extends straight or wavily in the direction indicated by the arrow B. The ridges 48a are arranged in the direction indicated by the arrow C (gravity direction). The oxygen-containing gas flow grooves 48b are arranged between the plurality of ridges 48a. Each of the oxygen-containing gas flow grooves 48b has a linear shape or a wavy shape.

The first metal separator 30 includes an inlet buffer 50a provided between the cathode supply passage 34a and the oxygen-containing gas flow field 48. The inlet buffer 50a includes a plurality of bosses formed by press forming. The first metal separator 30 includes an outlet buffer 50b provided between the cathode discharge passages 34b and the oxygen-containing gas flow field 48. The outlet buffer 50b includes a plurality of bosses formed by press forming.

A plurality of metal bead seals are formed on the surface 30a of the first metal separator 30. The metal bead seals are formed by press forming. The plurality of metal bead seals are expanded toward the resin frame equipped MEA 28 from the surface 30a. Instead of the metal bead seals, the first metal separator 30 may be provided with ridge shaped elastic seals made of elastic material. The plurality of metal bead seals include an outer bead 52a, and a plurality of passage beads 52b. The outer bead 52a is provided on the surface 30a and surrounds the oxygen-containing gas flow field 48, the cathode supply passage 34a and the cathode discharge passages 34b. The metal bead seals allow the oxygen-containing gas flow field 48 to be connected to the cathode supply passage 34a and the cathode discharge passages 34b.

The plurality of passage beads 52b surround the anode supply passage 38a, the anode discharge passages 38b, the coolant supply passages 36a, and the coolant discharge passages 36b, respectively. If necessary, the first metal separator 30 may further include an outer bead seal. The outer bead seal is provided on the outer periphery of the surface 30a.

As shown in FIG. 4, the second metal separator 32 has the fuel gas flow field 58 on its surface 32a facing the resin frame equipped MEA 28. The fuel gas flows in the fuel gas flow field 58 along the electrode surface in the direction indicated by the arrow B (horizontal direction). One end of the fuel gas flow field 58 in the direction indicated by the arrow B is connected to (in fluid communication with) the anode discharge passage 38b. The other end of the fuel gas flow field 58 in the direction indicated by the arrow B is connected to (in fluid communication with) the anode supply passage 38a. The fuel gas flow field 58 includes a plurality of ridges 58a extending in the direction indicated by the arrow B. The plurality of ridges 58a are arranged in the direction indicated by the arrow C (gravity direction). The fuel gas flow field 58 includes straight (or wavy) fuel gas flow grooves 58b between the ridges 58a.

The second metal separator 32 is provided with an inlet buffer 60a between the anode supply passage 38a and the fuel gas flow field 58. The inlet buffer 60a includes a plurality of bosses formed by press forming. The second metal separator 32 is provided with an outlet buffer 60b between the anode discharge passages 38b and the fuel gas flow field 58. The outlet buffer 60b includes a plurality of bosses formed by press forming.

A plurality of metal bead seals are formed on the surface 32a of the second metal separator 32. The metal bead seals are formed by press forming. The plurality of metal bead seals are expanded toward the resin frame equipped MEA 28 from the surface 32a. Instead of the metal bead seals, the second metal separator 32 may be provided with ridge shaped elastic seals made of elastic material. The plurality of metal bead seals include an outer bead 62a, and a plurality of passage beads 62b. The outer bead 62a surrounds the fuel gas flow field 58, the anode supply passage 38a and the anode discharge passages 38b. The outer bead 62a allows the fuel gas flow field 58 to be connected to the anode supply passage 38a and the anode discharge passages 38b.

The plurality of passage beads 62b surround the cathode supply passage 34a, the cathode discharge passages 34b, the coolant supply passages 36a, and the coolant discharge passages 36b, respectively. The second metal separator 32 may further include an outer bead. The outer bead extends further outside the outer bead 62a along the outer peripheral portion of the surface 32a.

As shown in FIG. 2, the first metal separator 30 and the second metal separator 32 are joined to each other by welding or brazing. A coolant flow field 66 is formed between a surface 30b of the first metal separator 30 and a surface 32b of the second metal separator 32. The coolant flow field 66 is connected to (in fluid communication with) the coolant supply passages 36a and the coolant discharge passages 36b. When the first metal separator 30 and the second metal separator 32 are stacked together, the coolant flow field 66 is formed between the back surface of the oxygen-containing gas flow field 48 of the first metal separator 30 and the back surface of the fuel gas flow field 58 of the second metal separator 32.

The upper cathode discharge passage 34b1 and the lower cathode discharge passage 34b2 in FIG. 3 are connected to each other at a different position in the stacking direction from the plane shown in the drawing. The upper cathode discharge passage 34b1 and the lower cathode discharge passage 34b2 are connected to the drain hole 72. The produced water flowing into the cathode discharge passage 34b is discharged from the drain hole 72. The upper anode discharge passage 38b1 and the lower anode discharge passage 38b2 are connected to each other on the back side of the plane shown in FIG. 4. The upper anode discharge passage 38b1 and the lower anode discharge passage 38b2 are connected to the drain hole 82. The produced water flowing into the anode discharge passage 38b is discharged from the drain hole 82.

Hereinafter, operation of the fuel cell stack 10 having the above structure will be described.

As shown in FIG. 1, the oxygen-containing gas is supplied to the cathode supply passage 34a of the end plate 20a. Further, the fuel gas is supplied to the anode supply passage 38a of the end plate 20a. A coolant such as pure water, ethylene glycol, or oil is supplied to the coolant supply passage 36a of the end plate 20a.

As shown in FIGS. 2 and 3, the oxygen-containing gas flows from the cathode supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28a.

On the other hand, as shown in FIGS. 2 and 4, the fuel gas flows from the anode supply passage 38a into the fuel gas flow field 58 of the second metal separator 32. The fuel gas flows along the fuel gas flow field 58 in the direction indicated by the arrow B, and the fuel gas is supplied to the anode 42 of the MEA 28a.

Thus, in each MEA 28a, the oxygen-containing gas supplied to the cathode 44 is partially consumed in electrochemical reactions in the cathode catalyst layer. Further, the fuel gas supplied to the anode 42 is partially consumed in electrochemical reactions in the anode catalyst layer. Through these electrochemical reactions, electric power is generated. That is, in each of the anode catalyst layers, hydrogen ions are generated by the removal of electrons from hydrogen in the fuel gas. The hydrogen ions are conducted through the electrolyte membrane 40 and move to a cathode side. The hydrogen ions react with oxygen in the oxygen-containing gas to generate water in the cathode catalyst layer. Thus, water is produced on the cathode side through the electrochemical reactions. Part of the produced water moves to the anode side through the electrolyte membrane 40.

Next, the oxygen-containing gas that has not been consumed in the cathode 44 flows separately into the upper cathode discharge passage 34b1 and the lower cathode discharge passage 34b2. The oxygen-containing gas is discharged in the direction indicated by the arrow A through the upper cathode discharge passage 34b1 and the lower cathode discharge passage 34b2. Most of the produced water moves in the oxygen-containing gas flow field 48 in the direction indicated by the arrow B along with the flow of the oxygen-containing gas. Then, the produced water flows into the upper cathode discharge passage 34b1 and the lower cathode discharge passage 34b2 through the outlet buffer 50b. The produced water condensed in the oxygen-containing gas is collected on the lower side by gravity, and thus is discharged mainly through the lower cathode discharge passage 34b2.

On the other hand, as shown in FIGS. 2 and 4, the fuel gas that has been supplied to the anode 42 and has not been consumed flows into the upper anode discharge passage 38b1 and the lower anode discharge passage 38b2. The fuel gas is discharged in the direction indicated by the arrow A through the upper anode discharge passage 38b1 and the lower anode discharge passage 38b2. Part of the produced water moves in the fuel gas flow field 58 in the direction indicated by the arrow B along with the flow of the fuel gas. Then, part of the produced water flows through the outlet buffer 60b to the upper anode discharge passage 38b1 and the lower anode discharge passage 38b2. The produced water condensed in the oxygen-containing gas is collected on the lower side by gravity, and thus is discharged mainly through the lower anode discharge passage 38b2.

The lower end portion of the lower anode discharge passage 38b2 is positioned even lower than the lowermost part of the fuel gas flow field 58. Thus, as shown in FIG. 5, even if the fuel cell stack 10 is inclined such that the lower anode discharge passage 38b2 is higher than the lower cathode discharge passage 34b2, the backflow of the produced water from the lower anode discharge passage 38b2 to the fuel gas flow field 58 can be suppressed.

Further, as shown in FIG. 6, the bottom portion 68a of the lower cathode discharge passage 34b2 is positioned even lower than the lowermost part of the oxygen-containing gas flow field 48. In the lower cathode discharge passage 34b2, it is possible that much more produced water stagnates. The position B1 of the bottom portion 68a of the lower cathode discharge passage 34b2 is positioned lower than the position B2 of the bottom portion 70a of the lower anode discharge passage 38b2. Accordingly, the fuel cell stack can suppress the backflow of the produced water from the lower cathode discharge passage 34b2 to the oxygen-containing gas flow field 48, even if the fuel cell stack 10 is inclined such that the lower cathode discharge passage 34b2 is positioned higher than the lower anode discharge passage 38b2.

Further, the lower cathode discharge passage 34b2 has the bottom portion 68a whose lower end portion is a linear side extending in the horizontal direction, and the inclined portions 68b and 68c on both side portions of the bottom portion 68a. Since the lower cathode discharge passage 34b2 has a large cross section at the lower part thereof, much more stagnant water can flow therethrough.

The fuel cell 12 and the fuel cell stack 10 according to the present embodiment offers the following advantages.

The fuel cell 12 according to the present embodiment includes the membrane electrode assembly 28a in which the anode 42 and the cathode 44 are arranged on both sides of an electrolyte membrane 40, respectively; separators (the first metal separator 30 and the second metal separator 32) disposed on both surfaces of the membrane electrode assembly 28a; and the fuel gas flow field 58 formed between the anode 42 of the membrane electrode assembly 28a and the separator, and configured to allow the fuel gas to flow in a horizontal direction; the oxygen-containing gas flow field 48 formed between the cathode 44 of the membrane electrode assembly 28a and the separator, and configured to allow the oxygen-containing gas to flow in the horizontal direction, the anode discharge passage 38b connected to one end of the fuel gas flow field 58 in the horizontal direction and configured to discharge the fuel gas in the stacking direction in which the membrane electrode assembly 28a and the separators are stacked, and the cathode discharge passage 34b connected to the other end of the oxygen-containing gas flow field 48 in the horizontal direction and configured to discharge the oxygen-containing gas in the stacking direction, wherein the bottom portion 68a of the lowermost cathode discharge passage 34b is provided below the bottom portion 70a of the lowermost anode discharge passage 38b.

In the fuel cell 12 described above, the bottom portion 68a of the lowermost cathode discharge passage 34b is provided below the bottom portion 70a of the lowermost anode discharge passage 38b. Accordingly, even if the fuel cell 12 is inclined, it is possible to suppress the backflow of the produced water from the cathode discharge passage 34b to the oxygen-containing gas flow field 48. As a result, in the fuel cell 12, it is possible to prevent the produced water from blocking the oxygen-containing gas flow field 48.

In the fuel cell 12 described above, each of the anode discharge passage 38b and the cathode discharge passage 34b may be formed in a polygonal shape and have inclined portions (68b, 68c, 70b, and 70c) inclined so as to obliquely spread upward on both side portions adjacent to a vertex or a side of the bottom portion (68a, 70a). According to the fuel cell 12, even if the fuel cell 12 is inclined, it is possible to suppress the backflow of the produced water.

The fuel cell 12 described above may further includes the passage bead 52b configured to surround a periphery of the cathode discharge passage 34b, and the tunnel portion 64 penetrating through the passage bead 52b and configured to allow the cathode discharge passage 34b and the oxygen-containing gas flow field 48 to connect with each other, and the tunnel portion 64 may be arranged above one of the inclined portions (68b). According to the fuel cell 12, the tunnel portion 64 is disposed above the portion where the produced water is held. As a result, the fuel cell 12 prevents the tunnel portion 64 from being blocked by the droplets of the produced water.

In the fuel cell 12 described above, the bottom portion 68a of the cathode discharge passage 34b may be formed by a straight side. As a result, the cathode discharge passage 34b has a large cross section of a flow path in the vicinity of the bottom portion 68a, and the cathode discharge passage 34b can hold a larger amount of produced water therein.

In the fuel cell 12 described above, the bottom portion 68a of the cathode discharge passage 34b and the bottom portion 70a of the anode discharge passage 38b may be formed below a lower end portion of a power generation surface.

The fuel cell stack 10 of the present embodiment includes the stack body 14 in which a plurality of fuel cells 12 are stacked. According to the fuel cell stack 10, it is possible to discharge produced water without stagnation even when the fuel cell stack 10 is inclined.

Although the present invention has been described with reference to the preferred embodiments, the present invention is not limited to the above embodiments. It is a matter of course that various modifications may be made without departing from the gist of the present invention.

What is claimed is:

1. A fuel cell comprising:
   a membrane electrode assembly in which an anode and a cathode are arranged on both sides of an electrolyte membrane, respectively;
   separators disposed on both surfaces of the membrane electrode assembly;
   a fuel gas flow field formed between the anode of the membrane electrode assembly and one of the separators, and configured to allow a fuel gas to flow in a horizontal direction;
   an oxygen-containing gas flow field formed between the cathode of the membrane electrode assembly and another of the separators, and configured to allow an oxygen-containing gas to flow in the horizontal direction;
   a passage bead configured to surround a periphery of the cathode discharge passage; and
   a tunnel portion penetrating through the passage bead and configured to allow the cathode discharge passage and the oxygen-containing gas flow field to connect with each other,
   wherein a stacking direction in which the membrane electrode assembly and the separators are stacked extends in the horizontal direction,
   an anode discharge passage is formed in a lower portion of one end of the fuel cell in the horizontal direction that is orthogonal to the stacking direction, and the anode discharge passage is connected to the fuel gas flow field and configured to discharge the fuel gas in the stacking direction in which the membrane electrode assembly and the separators are stacked, and
   a cathode discharge passage is formed in a lower portion of another end of the fuel cell in the horizontal direction orthogonal to the stacking direction, and the cathode discharge passage is connected to the oxygen-containing gas flow field and configured to discharge the oxygen-containing gas in the stacking direction,
   a bottom portion of the cathode discharge passage is provided below a bottom portion of the anode discharge passage,
   each of the anode discharge passage and the cathode discharge passage is formed in a polygonal shape and has inclined portions inclined so as to obliquely spread upward on both side portions adjacent to a vertex or a side of the bottom portion, and
   the tunnel portion is arranged above the inclined portions.

2. The fuel cell according to claim 1, wherein the bottom portion of the cathode discharge passage is formed by a straight side.

3. The fuel cell according to claim 1, wherein the bottom portion of the cathode discharge passage and the bottom portion of the anode discharge passage are formed below a lower end portion of a power generation surface.

4. A fuel cell stack comprising a stack body including a plurality of stacked fuel cells, the fuel cells each comprising:
   a membrane electrode assembly in which an anode and a cathode are arranged on both sides of an electrolyte membrane, respectively;
   separators disposed on both surfaces of the membrane electrode assembly;
   a fuel gas flow field formed between the anode of the membrane electrode assembly and one of the separators, and configured to allow a fuel gas to flow in a horizontal direction;
   an oxygen-containing gas flow field formed between the cathode of the membrane electrode assembly and another of the separators, and configured to allow an oxygen-containing gas to flow in the horizontal direction;
   a passage bead configured to surround a periphery of the cathode discharge passage; and
   a tunnel portion penetrating through the passage bead and configured to allow the cathode discharge passage and the oxygen-containing gas flow field to connect with each other,
   wherein a stacking direction in which the membrane electrode assembly and the separators are stacked extends in the horizontal direction,
   an anode discharge passage is formed in a lower portion of one end of the fuel cell in the horizontal direction that is orthogonal to the stacking direction, and the anode discharge passage is connected to the fuel gas flow field and configured to discharge the fuel gas in the stacking direction in which the membrane electrode assembly and the separators are stacked,
   a cathode discharge passage is formed in a lower portion of another end of the fuel cell in the horizontal direction orthogonal to the stacking direction, and the cathode discharge passage is connected to the oxygen-containing gas flow field and configured to discharge the oxygen-containing gas in the stacking direction,
   a bottom portion of the cathode discharge passage is provided below a bottom portion of the anode discharge passage,
   each of the anode discharge passage and the cathode discharge passage is formed in a polygonal shape and has inclined portions inclined so as to obliquely spread upward on both side portions adjacent to a vertex or a side of the bottom portion, and
   the tunnel portion is arranged above the inclined portions.

* * * * *